Patented Feb. 16, 1954

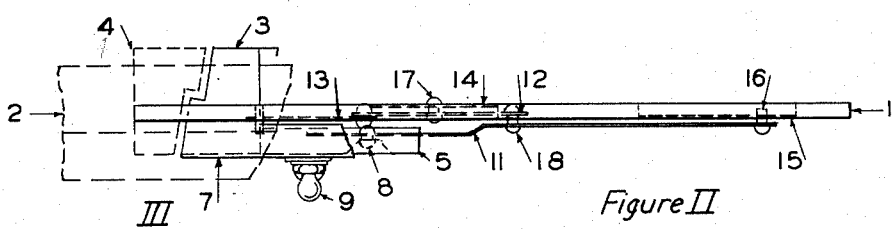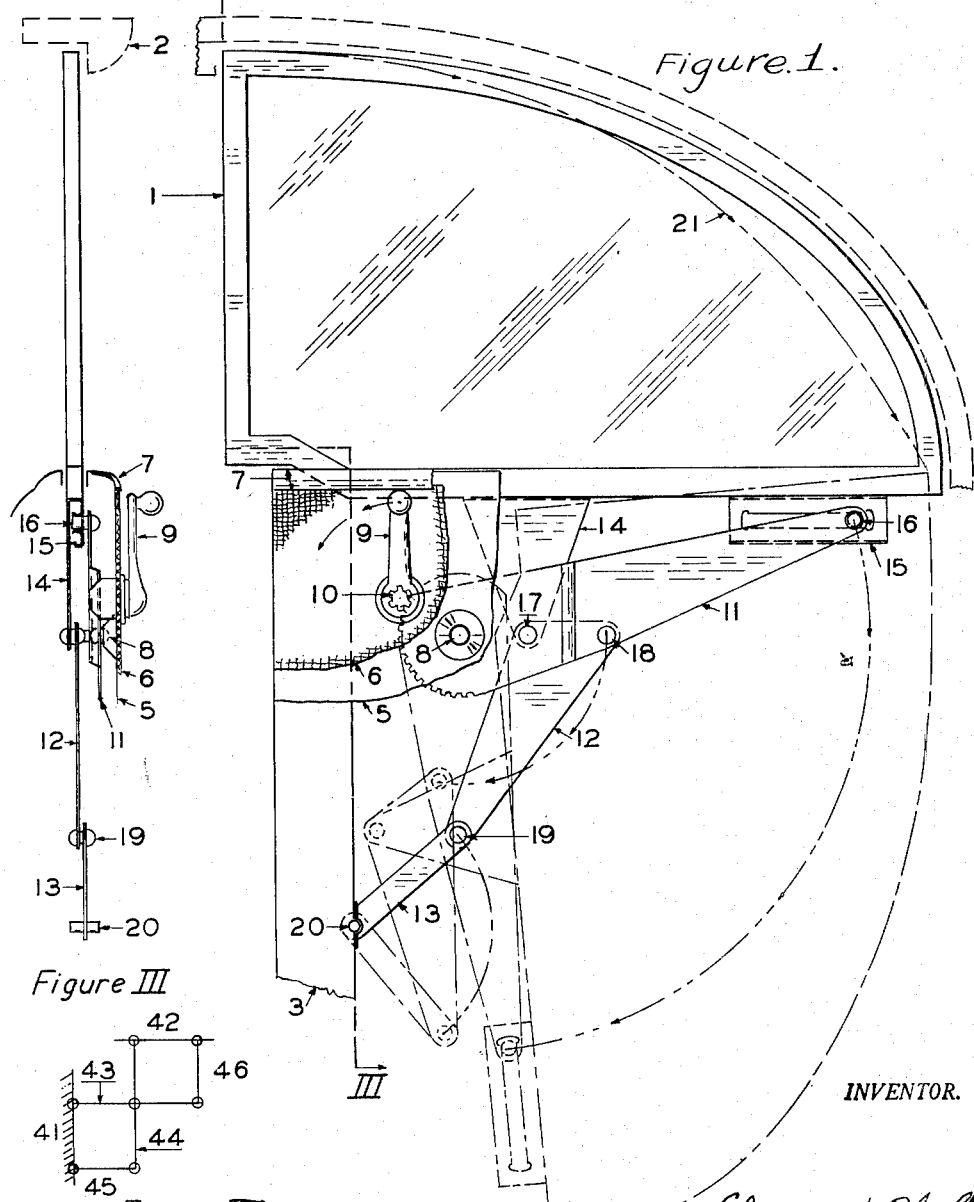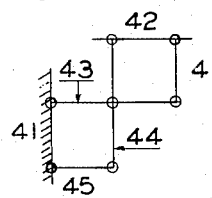

2,669,450

UNITED STATES PATENT OFFICE 2,669,450

WINDOW REGULATOR FOR THE REAR QUARTER WINDOW OF AUTOMOBILES

Clarence L. Pfeiffer, Ypsilanti, Mich.

Application November 28, 1950, Serial No. 197,928

3 Claims. (Cl. 268—104)

1

The invention relates to the movement of the window in going from the "up" or "closed" position to the "down" or "open" position or vice versa. The object of the improvement is that in the movement of the window the upper front corner of the glass or frame will not cut into the roof rail of header as is now done by the conventional hinge or regulator.

The form of the invention is shown in the accompanying drawing in which Figure I is a side view of the window as it sets in the automobile body, except that this view looks at the window from the inside of the body and is taken square to the plane of the glass. Figure II is a plan view omitting the header or roof rail. Figure III is a front view, taken at right angles to Figure I, with the door and body pillars omitted.

I is the metal frame that holds the glass. This is essential only along the bottom of the glass, but is shown here all around as this is conventional construction. 2 is the bottom portion of the side rails of a convertible or roof rail of the convertible type body, to which the window fits when up or closed. 3 represents the stationary pillar of the body to which the door pillar 4 fits. 5 is the inside rear quarter panel which supports the trim pad 6, and inside garnish or finishing moulding 7. These last three parts, 5, 6 and 7, are cut off close in the drawing, being shown only in the upper front corner in order that the essential parts of this mechanism may be made more clear. Inside panel 5 may also be used as a support for the regulator mechanism and is so supported here by pin 8. For simplicity in this drawing the inner panel 5 also supports the operating or control handle 9, and its spur gear 10.

The regulator or hinge mechanism consists of the arm 11, links 12 and 13, brackets 14 and 15, in conjunction with lower portion of glass channel 1, body pillar 3, and inner panel 5. Arm 11, besides being pivoted on and supported by the inner panel by pin 8, is locked and held in position by the usual window regulator lock and spur gear 10. To the lower glass retainer channel 1 are attached the two brackets 14 and 15. Arm 11 connects to bracket 15 by means of pin 16, which both slides and rotates therein. Link 12 is connected to bracket 14 by means of a rivet or pin 17, which allows rotation only. Link 12 is also connected to arm 11 by pin 18, and to link 13 by pin 19, in the same manner. Link 13 is connected to the body pillar through pivot 20.

To move the window from the up position as shown by the solid lines to the down position as shown by dot and dash lines, the regulator handle 9 is rotated counterclockwise as shown by the arrow. This operates spur gear 10, which is engaged in teeth formed in the end of arm 11, which is thereby moved clockwise as shown. Link 13 also moves clockwise by its connection to 11 through 12. Link 12 also guides the forward end of glass frame 1 through bracket 14. Line 21 shows the path of the upper front corner of the window in moving from one extreme position to the other.

The essential elements of this mechanism are shown in kinematic form in Figure IV, in which link 41 is fixed and corresponds to the body pillar and inside quarter panel. Link 42 corresponds to the glass channel 1 and bracket 14. Links 43 and 44 are ternary and correspond respectively to 11 and 12. Link 45 is a binary and corresponds to 13. In place of the binary link 46, the sliding pair, bracket 15 and pin 16, is substituted. This substitution in no wise affects the constraint of the mechanism.

Prior to my invention rear quarter windows have been hinged on a fixed pivot mounted in or behind the body pillar. In this position of pivot, the upper front corner of the glass or glass frame is forced up and into the roof rail of header when being moved. The window regulator itself has been a separate unit but connected to the glass frame usually below the lower glass channel so as to move or hold it in position. My invention makes the bottom rail of the glass frame a part of the regulator and causes the frame and glass to swing upon an infinite series of instantaneous centers which constantly change position but which are so located that in the movement of the window the upper front corner of the frame or glass always clears the header or roof rail. Whether the force to move the window be supplied manually or mechanically or upon what link it is applied is of no concern here.

I claim:

1. A regulator for the rear quarter window of a convertible or a convertible type automobile body for the movement of the window from the up or closed position where the bottom rail of the frame is horizontal to the down or open position where said bottom rail is substantially vertical, said bottom rail having affixed below and at its rear end a bracket with an elongated slot, a second downwardly projecting bracket affixed to an intermediate portion of the bottom rail, an arm positioned below the bottom rail and extending lengthwise thereof, one end of said arm carrying a rotatable pin slidably engaged in said slot, means adapted to be mounted on the body providing a fixed pivot for the other end of the arm, a first link having two pivots adjacent one end spaced from each other along a line extending transversely of the link and a third pivot adjacent the other end of the link, one of the two pivots adjacent one end of the link connecting the link with the depending end of the second bracket, the other pivot connecting the link with an intermediate portion of the arm, a second link connected at one end to the pivot at the other end of the first link, means pivotally connecting the other end of the second link to the body, the arm being provided with gear teeth arranged in an arc about the center of the fixed pivot thereof, a pinion meshing with said teeth, means for mounting said pinion, and means connected to the pinion by which the pinion may be rotated.

2. A regulator for the rear quarter window of a convertible or convertible type automobile body for the movement of the window from the up or closed position where the bottom rail of the frame is horizontal to the down or open position where said bottom rail is substantially vertical, said bottom rail having affixed below it two brackets, the first attached to the forward half and carrying a depending pivot hole or pin, the second attached near the rear end carrying an elongated slot, an arm positioned below said bottom rail and extending lengthwise thereof, the forward end of said arm being pivoted to a fixed portion of the body, the rear end of arm carrying a round pin which is slidably engaged into aforementioned elongated slot, a floating ternary link having two of its pivot points near its upper end, the forward of these two being connected with the forward bottom rail bracket, the rearward one connecting to an intermediate point on aforementioned arm, the third and lower pivot point on aforesaid ternary being connected by a binary link to a fixed pivot on the body, means provided on aforesaid arm for moving and holding same in desired position.

3. A regulator for the rear quarter window of a convertible or convertible type automobile body for the movement of the window from the up or closed position where the bottom rail of the frame is horizontal to the down or open position where said bottom rail is substantially vertical, said bottom rail having affixed below it two brackets, the first attached to the forward half and carrying a depending pivot hole or pin, the second attached near the rear end and carrying an elongated slot which all together constitutes one binary link, an arm positioned below said bottom rail and extending lengthwise thereof, the forward end of said arm being pivoted to a fixed portion of the body, the rear end of arm carrying a round pin which is slidably engaged into aforementioned elongated slot, said sliding pin being a substitute for a link, a floating ternary link having two of its pivot points near the upper end, the forward of these two connecting the forward bottom rail bracket, the rearward one connecting to an intermediate point on aforementioned arm, thereby making said arm a ternary link, the third and lower pivot point on said floating ternary is connected by a simple binary link to a fixed pivot point on body, making the body a binary link in a six link restrained mechanism, means provided on aforesaid arm for moving and holding to any desired position.

CLARENCE L. PFEIFFER.

References Cited in the file of this patent

UNITED STATES PATENTS

| Number | Name | Date |
| --- | --- | --- |
| 2,105,830 | Aiken | Jan. 18, 1938 |
| 2,351,285 | Parsons | June 13, 1944 |
| 2,410,363 | Roethel | Oct. 29, 1946 |
| 2,422,830 | Greenmun | July 12, 1949 |
| 2,475,985 | Parsons | July 12, 1949 |